Dec. 19, 1967     C. D. HENCHBARGER     3,358,308
SWING-TYPE LOADING RAMP
Filed Oct. 20, 1965     2 Sheets-Sheet 1
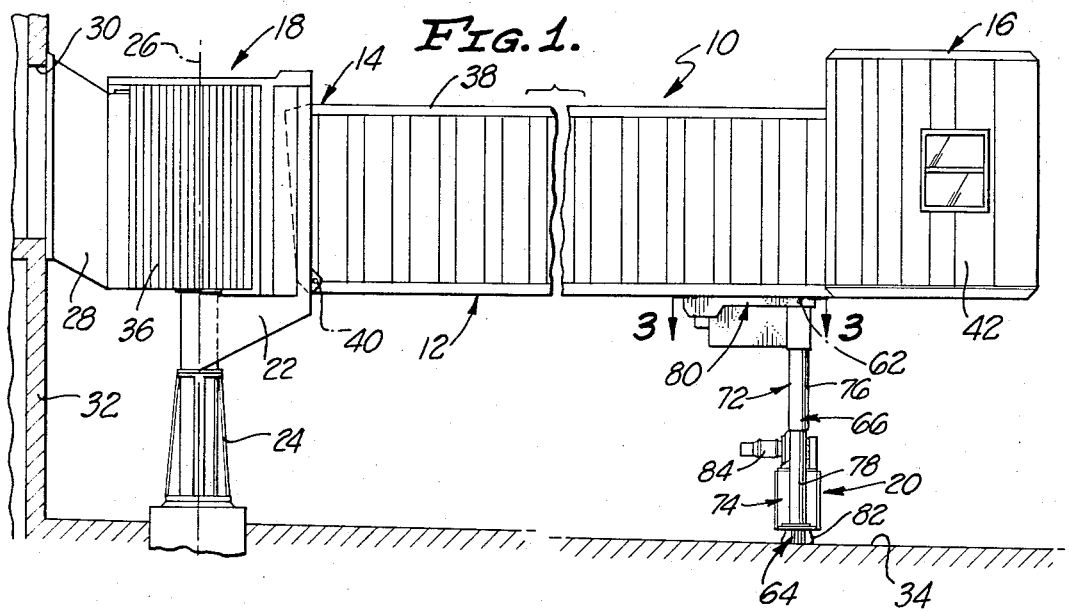
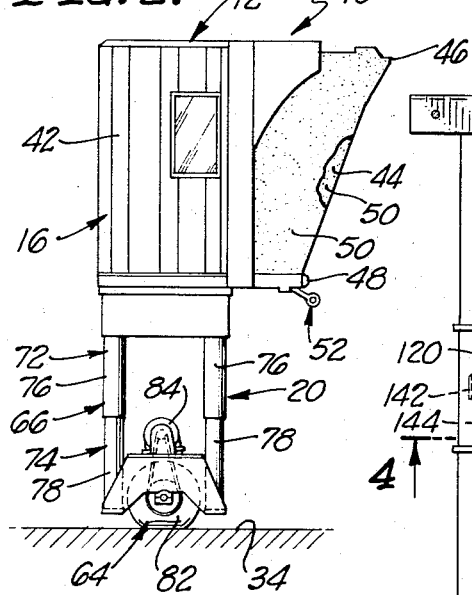
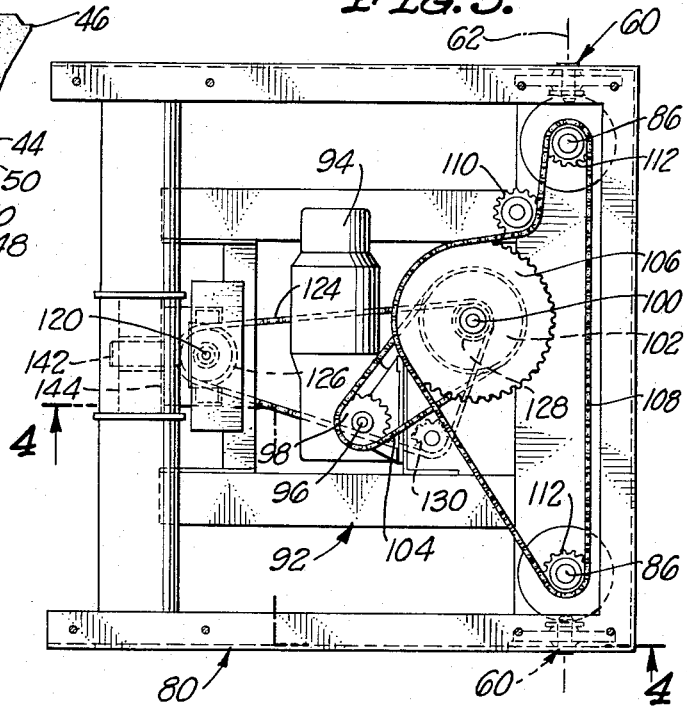
INVENTOR
CHARLES D. HENCHBARGER
BY HIS ATTORNEYS
HARRIS, KIECH, RUSSELL & KERN

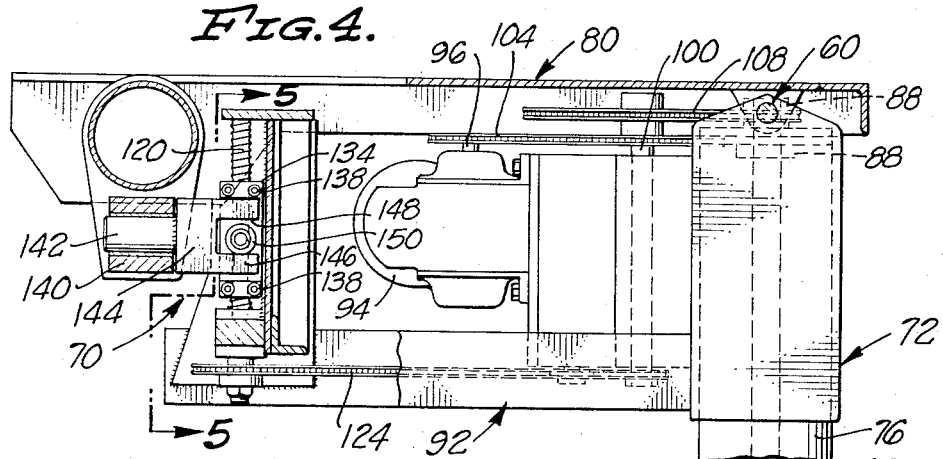
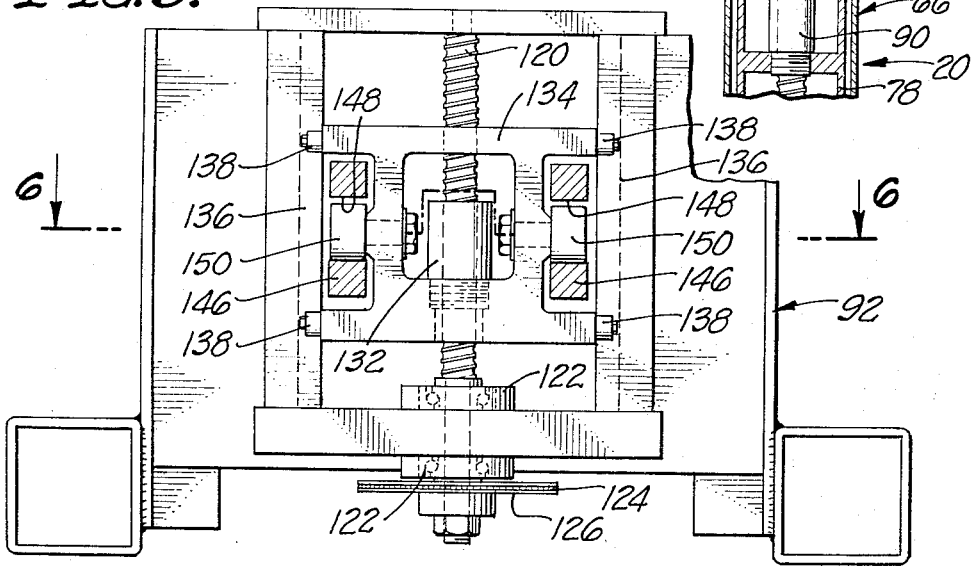
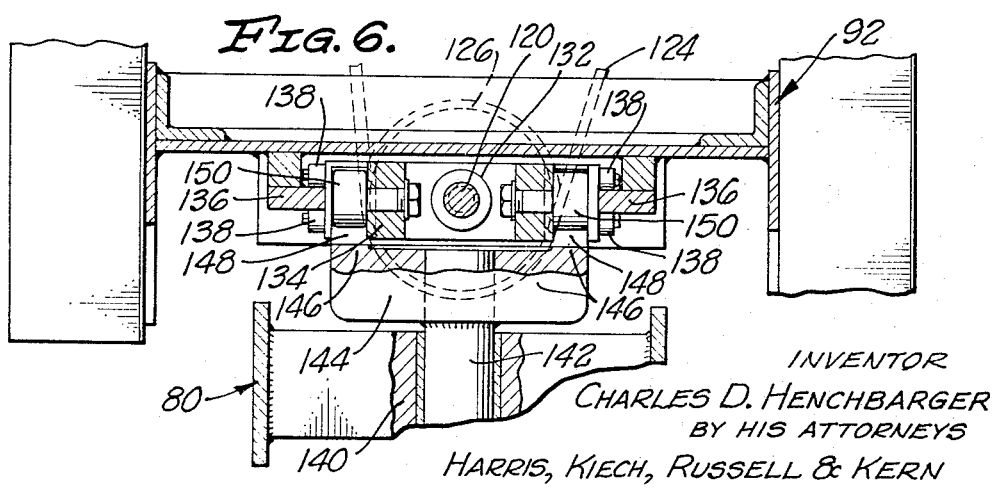

United States Patent Office 3,358,308
Patented Dec. 19, 1967

3,358,308
SWING-TYPE LOADING RAMP
Charles D. Henchbarger, Playa Del Rey, Calif., assignor to Stanray Corporation, Chicago, Ill., a corporation of Delaware
Filed Oct. 20, 1965, Ser. No. 498,601
4 Claims. (Cl. 14—71)

ABSTRACT OF THE DISCLOSURE

A passenger loading and unloading ramp for airplanes having a passageway adapted to be swung horizontally about an upright axis adjacent its inner end between an inoperative, retracted position and an operative, extended position. When the passageway is in its extended position, a laterally-facing doorway in the outer end thereof is vertically aligned with a doorway in the airplane. The ramp is provided with mechanism for raising or lowering the outer end of the passageway as required to horizontally register the doorway therein with the doorway in the airplane. The outer end of the passageway is carried by a support which includes a wheel rollable along a predetermined arcuate path, and the ramp includes mechanism for pivoting the wheeled support relative to the passageway as required to prevent lateral skidding of the wheel relative to the desired arcuate path.

Background of invention

The present invention relates in general to ramps for loading and unloading vehicles and, more particularly, to a ramp having a passageway adapted to be swung horizontally about an upright axis adjacent its inner end between an inopertive, retracted position and an operative, extended position. When the passageway is in the latter position, a laterally-facing doorway in the outer end of the passageway is vertically aligned with a doorway in the vehicle to be loaded or unloaded. The ramp also includes means for raising or lowering the outer end of the passageway as required to horizontally register the laterally-facing doorway therein with the doorway in the vehicle, the passageway being vertically pivotable about a transverse horizontal axis adjacent its inner end to permit such raising and lowering of its outer end.

The ramp of the invention is especially applicable to loading and unloading aircraft, and is of particular utility when the passageway thereof is located above ground level a distance sufficient to provide a generally horizontal walkway for passengers boarding or disembarking from the airplane. Consequently, the ramp of the invention will be disclosed in such an environment herein for convenience, and, more specifically, will be disclosed as providing a generally horizontal walkway between the aircraft and an above-ground-level floor of an airport terminal building, or other facility.

In general, the invention contemplates a vehicle loading ramp which includes inner supporting means connected to the inner end of the passageway and supporting same for horizontal swinging movement of the passageway about an upright axis and for vertical pivotal movement of the passageway about an inner transverse horizontal axis. The vehicle loading ramp further includes upright outer supporting means supporting the outer end of the passageway for horizontal swinging movement of the passageway about the upright axis mentioned, and for vertically pivoting the passageway about the aforementioned inner transverse horizontal axis. The outer supporting means includes ground-engaging wheel means, preferably self-propelled, movable along a predetermined arc about the upright axis mentioned, and includes vertically extensible and contractible means for vertically pivoting the passageway about the inner transverse horizontal axis hereinbefore referred to.

Objects of invention

The primary object of the invention is to provide means for stabilizing the outer supporting means relative to the passageway which does not produce lateral skidding of the wheel means relative to the ground as the outer end of the passageway is raised and lowered.

More particularly, an important object of the invention is to provide a vehicle loading ramp of the foregoing nature which includes means pivotally interconnecting the outer supporting means and the passageway for relative pivotal movement thereof about an outer transverse horizontal axis spaced outwardly from and parallel to the inner transverse horizontal axis mentioned, and which includes control means interconnecting the outer supporting means and the passageway for relatively pivoting the outer supporting means and the passageway about the outer transverse horizontal axis in directions to maintain the wheel means substantially on the desired arc despite actuation of the vertically extensible and contractible means to raise or lower the outer end of the passageway.

The foregoing construction prevents lateral skidding of the wheel means as the vertically extensible and contractible means is actuated to pivot the passageway vertically about the inner transverse horizontal axis. This is an important feature since it prevents the excessive tire wear which lateral skidding of the wheel means would produce.

Another important object of the invention is to provide the vehicle loading ramp with control means interconnecting the outer supporting means and the passageway, and responsive to extension and contraction of the vertically extensible and contractible means to pivot the passageway vertically about the inner transverse horizontal axis, for relatively pivoting the outer supporting means and the passageway about the outer transverse horizontal axis in directions to maintain substantially constant the upright orientation of the outer supporting means and to maintain the wheel means substantially on the desired arc.

A further important object is to provide means for actuating the vertically extensible and contractible means and the control means in synchronism to insure maintaining the wheel means substantially on the predetermined arc.

Still another object is to provide vertically extensible and contractible means and control means respectively including rotatable screws, and to provide means for rotating the screws in synchronism.

Yet another object is to provide the control means with a lost-motion interconnection between the passageway and the outer supporting means which enables the screw of the control means to operate properly despite relative pivoting of the outer supporting means and the passageway.

The foregoing objects, advantages, features and results of the present invention together with various other objects, advantages, features and results thereof which will be evident to those skilled in the art in the light of this disclosure, may be achieved with the exemplary embodiment of the invention described in detail hereinafter and illustrated in the accompanying drawings.

Description of drawings

In the drawings:
FIG. 1 is a side elevational view of a swing-type aircraft loading ramp which embodies the invention;
FIG. 2 is an elevational view of the outer end of the loading ramp illustrated in FIG. 1;

FIG. 3 is an enlarged, fragmentary sectional view taken as indicated by the arrowed line 3—3 of FIG. 1;

FIG. 4 is an enlarged, fragmentary sectional view taken as indicated by the arrowed line 4—4 of FIG. 3;

FIG. 5 is an enlarged, fragmentary sectional view taken as indicated by the arrowed line 5—5 of FIG. 4; and FIG. 6 is a fragmentary sectional view taken as indicated by the arrowed line 6—6 of FIG. 5.

*Description of preferred embodiment of invention*

Referring particularly to FIG. 1 of the drawings, the loading ramp of the invention is designated generally by the numeral 10 and includes a passageway, indicated generally by the numeral 12, having inner and outer ends 14 and 16 respectively supported by inner and outer supporting means or structures 18 and 20.

The inner supporting structure 18 includes an inner supporting frame 22 suitably mounted on a base 24 for pivotal movement relative thereto about an upright axis 26. In the construction shown, the inner supporting structure 18 constitutes a foyer or rotunda through which passengers walk between the passageway 12 and a passageway 28 communicating with a doorway 30 in an airport terminal building or other facility 32 at a level above the level of the ground 34. The rotunda 18 includes side curtains 36 which maintain the sides thereof enclosed in a suitable manner irrespective of the angular position of the supporting frame 22.

The passageway 12 includes an inner, tunnel section or tunnel 38 which is connected to the supporting frame 22 for vertical pivotal movement of the entire passageway 12 about an inner transverse horizontal pivot axis 40. The entire passageway 12 pivots vertically about this axis as the outer end of the passageway is raised and lowered by the outer supporting structure 20 in a manner to be described.

The passageway 12 includes an outer, cab section or cab 42 connected to the outer end of the tunnel 38.

As best shown in FIG. 2 of the drawings, the cab 42 is provided with a laterally-facing doorway 44 adapted to register with a doorway in an airplane, not shown, when the passageway 12 is swung horizontally into its operative position and the cab 42 is raised or lowered into a position such that its floor is flush with the floor of the airplane. Above and below the doorway 44 in the cab 42 are resilient bumpers 46 and 48 engageable with the side of the fuselage of the airplane above and below the doorway therein. The doorway 44 in the cab 42 is also embraced by flexible side curtains 50 adapted to yield to conform to the contour of the side of the fuselage of the airplane on opposite sides of the doorway therein.

In addition to the foregoing, the cab 42 may be provided with automatic leveling means 52 for causing the outer supporting structure 20 to move the cab upwardly and downwardly with the airplane as the airplane moves upwardly and downwardly due to increases and decreases, respectively, in the load therein. The automatic leveling means 52 may be similar to that disclosed in Patent No. 3,086,152, issued Apr. 16, 1963, to Robert D. Lichti and Carl L. Lodjic, and may control the outer supporting structure 20 in a manner similar to that disclosed in such patent.

The outer supporting structure 20 is located beneath the outer end of the tunnel section 38 of the passageway 12. Pivot means 60 interconnects the outer supporting structure 20 and the tunnel section 38 for relative pivotal movement thereof about an outer transverse horizontal axis 62 spaced from and parallel to the inner transverse horizontal axis 40. The outer supporting structure 20 also includes ground-engaging, self-propelled wheel means 64 movable over the ground 34 along a predetermined arc having its center on the upright axis 26. Additionally, the outer supporting structure 20 includes vertically extensible and contractible means 66 for vertically pivoting the entire passageway 12 about the inner transverse horizontal axis 40 to raise and lower the outer end 16 of the passageway.

An important feature of the invention is that it includes control means 70 interconnecting the outer supporting structure 20 and the tunnel section 38 of the passageway 12, and responsive to extension and contraction of the vertically extensible and contractible means 66 to pivot the passageway 12 vertically about the inner transverse horizontal axis 40, for relatively pivoting the outer supporting structure 20 and the passageway 12 about the outer transverse horizontal axis 62, as the outer end 16 of the passageway is raised and lowered, in directions to maintain the outer supporting structure substantially upright and to maintain the wheel means 64 substantially on a fixed arc at all times. Effectively, the control means 70 causes the outer supporting structure 20 to pivot relative to the ground 34 as the outer end 16 of the passageway 12 is raised and lowered by the vertically extensible and contractible means 66, which permits the wheel means 64 to remain substantially on the desired arc at all times. This is an important feature of the invention since it prevents lateral skidding of the wheel means 64 as the outer end 16 of the passageway 12 is raised and lowered, thereby minimizing tire wear, and the like.

Considering the outer supporting structure 20 in more detail now, it includes telescopically interconnected, U-shaped, upper and lower frames 72 and 74, the upper U-shaped frame being inverted and having depending arms 76 telescoped over upstanding arms 78 of the lower U-shaped frame.

The pivot means 60 connects the upper U-shaped frame 72 to a tunnel subframe 80 for relative pivotal movement about the outer transverse horizontal axis 62. The tunnel subframe 80 is suitably secured to the tunnel section 38 of the passageway 12 adjacent the outer end of such section.

The wheel means 64 is shown as comprising a single, tired wheel 82 mounted on the lower end of the lower U-shaped frame 74 of the outer supporting structure 20, the wheel 82 being rotatable about an axis perpendicular to the upright axis 26. Preferably, the wheel means 64 is self-propelled and, for this purpose, the lower U-shaped frame 74 carries a reversible drive motor 84 suitably connected to the wheel 82.

Considering the vertically extensible and contractible means 66, it is shown as comprising two screws 86 disposed within and extending axially of the telescopically interconnected arms 76 and 78 of the frames 72 and 74. The screws 86 are rotatably mounted in the arms 76 of the upper frame 72 and react against thrust bearings 88 at the upper ends thereof. The screws 86 extend downwardly into the arms 78 of the lower frame 74 through nuts 90 carried by the lower arms 78. As will be apparent, by rotating the screws 86 in one direction or the other, the telescopically interconnected arms 76 and 78 are caused to extend or contract to raise or lower the outer end 16 of the passageway 12 by pivoting the entire passageway about the inner transverse horizontal axis 40.

Considering the manner in which the screws 86 are driven, the upper U-shaped frame 72 of the outer supporting structure 20 carries an extension frame 92 which projects longitudinally of the passageway 12 toward the inner end 14 thereof in the particular construction illustrated. Carried by the extension frame 92 is a drive motor 94 having an upright shaft 96 carrying a sprocket 98, FIG. 3. Spaced from and parallel to the motor shaft 96, and carried by the extension frame 92, is an upright countershaft 100 carrying a sprocket 102 aligned with the sprocket 98. The motor 94 drives the countershaft 100 through a chain 104 trained around the sprockets 98 and 102. Also carried by the countershaft 100 is a drive sprocket 106 having trained therearound a chain 108 which is also trained around an idler sprocket 110 on the extension frame 92 and around driven sprockets 112 on the respective screws 86.

The motor 94, which is a reversible motor, drives the screws 86 in one direction or the other through the chains 104 and 108, thereby extending or contracting the telescopically interconnected frames 72 and 74 to raise or lower the outer end 16 of the passageway 12.

Considering the control means 70, it includes an upright screw 120 rotatably mounted on the extension frame 92 and equipped with thrust bearings 122, FIG. 5. The screw 120 is proportionately driven in synchronism with the screws 86 by a chain 124 trained around a sprocket 126 on the screw 120, a sprocket 128 on the countershaft 100, and an idler sprocket 130 on the extension frame 92.

The control means 70 also includes a traveling nut 132 through which the screw 120 is threaded and which is carried by a frame 134 movable upwardly and downwardly relative to the extension frame 92. More particularly, the extension frame 92 is provided with two laterally spaced rails 136, FIGS. 5 and 6, each of which is engaged by two pairs of wheels 138 on the traveling frame 134. Specifically, the wheels 138 of each pair embrace the corresponding rail 136. With this construction, the traveling nut 132 is guided upwardly and downwardly relative to the extension frame 92 as the control screw 120 is rotated in one direction or the other, and, at the same time, rotation of the traveling frame with the screw is prevented.

The tunnel subframe 80 carries a bearing 140 which is oriented longitudinally of the passageway 12 and which receives a stub shaft 142 on a yoke 144 having bifurcated arms 146 spaced apart laterally of the passageway 12. More particularly, the bifurcated arms 146 are provided therein with notches 148 receiving rollers 150 mounted on the traveling frame 134.

With the foregoing construction, as the control screw 120 is rotated in one direction or the other, it causes the traveling frame 134 to move upwardly or downwardly, relative to the extension frame 92, along the rails 136. Such movement of the traveling frame 134 is communicated to the passageway 12, through the yoke 144 and the tunnel subframe 80, to cause relative pivotal movement of the passageway 12 and the outer supporting structure 20 about the outer transverse horizontal axis 62 provided by the pivot means 60. The pivotal connection between the yoke 144 and the tunnel subframe 80 provided by the bearing 140 and the stub shaft 142, and the lost-motion or floating connection between the yoke 144 and the traveling frame 134 provided by the rollers 150 in the notches 148, permit such relative pivotal movement of the passageway 12 and the outer supporting structure 20 without any binding of any of the components of the control means 70. More particularly, it will be noted that as the passageway 12 and the outer supporting structure 20 pivot relative to each other about the outer transverse horizontal axis 62, the yoke 144 can rock about the axis of the bearing 140, and the rollers 150 can move back and forth in the notches 148 in the arms 146 of the yoke, to prevent any possibility of binding of any of the elements of the control means 70.

Considering the over-all operation of the invention, it will be assumed for convenience that the passageway 12 is in the position shown in FIG. 1 and that the screws 86 are driven in a direction to lower the outer end 16 of the passageway. If the passageway 12 and the outer supporting structure 20 were rigidly interconnected, such lowering of the outer end 16 of the passageway would result in inward skidding of the wheel means 64 toward the inner supporting base 24. In accordance with the invention, however, as the screws 86 are driven in a direction to lower the outer end 16 of the passageway 12, the control screw 120 is simultaneously driven in a direction such that it pivots the extension frame 92 downwardly away from the tunnel subframe 80 to pivot the outer supporting structure 20 in the counterclockwise direction (as viewed in FIG. 1) relative to the passageway 12, the speed of the control screw 120 relative to that of the screws 86 being such that the wheel means 64 remains substantially on the desired arcuate path. In other words, the entire outer supporting structure 20 is pivoted relative to the passageway 12 to the extent required to offset the tendency of the wheel means 64 to skid inwardly. Conversely, when the screws 86 are driven in the opposite direction to raise the outer end 16 of the passageway 12, the control screw 120 is driven in the opposite direction, to pivot the extension frame 92 upwardly toward the tunnel subframe 80, and thus pivot the entire outer supporting structure 20 in the clockwise direction (as viewed in FIG. 1) relative to the passageway 12, at such a speed as to again maintain the wheel means 64 substantially on the desired arcuate path, thereby offsetting the tendency of the wheel means to skid outwardly. Effectively, the control means 70 causes the outer supporting structure 20 to pivot or tilt relative to the ground 34 about a pivot axis tangent to the desired arcuate path and bisecting the area of contact between the wheel 82 and the ground 34. Consequently, as the outer end 16 of the passageway 12 is raised and lowered, there is no tendency to skid the tire of the wheel 82 laterally, thereby preventing wear from such source, which is an important feature of the invention.

Although an exemplary embodiment of the invention has been disclosed herein for purposes of illustration, it will be understood that various changes, modifications and substitutions may be incorporated in such embodiment without departing from the spirit of the invention as defined by the following claims.

I claim as my invention:

1. In a vehicle loading ramp, the combination of:
   (a) a passageway having inner and outer ends;
   (b) inner supporting means connected to said inner end of said passageway and supporting same for horizontal swinging movement of said passageway about an upright axis and for vertical pivotal movement of said passageway about an inner transverse horizontal axis;
   (c) outer supporting means supporting said outer end of said passageway for horizontal swinging movement of said passageway about said upright axis, and for vertically pivoting said passageway about said inner transverse horizontal axis;
   (d) means pivotally interconnecting said outer supporting means and said passageway for relative pivotal movement thereof about an outer transverse horizontal axis;
   (e) said outer supporting means including ground-engaging wheel means movable along a predetermined arc about said upright axis;
   (f) said outer supporting means including means for vertically pivoting said passageway about said inner transverse horizontal axis to raise and lower said outer end of said passageway; and
   (g) control means interconnecting said outer supporting means and said passageway for pivoting said outer supporting means relative to said passageway about said outer transverse horizontal axis in directions to maintain said wheel means substantially on said predetermined arc as said outer end of said passageway is raised and lowered.

2. In a vehicle loading ramp, the combination of:
   (a) a passageway having inner and outer ends;
   (b) inner supporting means connected to said inner end of said passageway and supporting same for horizontal swinging movement of said passageway about an upright axis and for vertical pivotal movement of said passageway about an inner transverse horizontal axis;
   (c) upright outer supporting means supporting said outer end of said passageway for horizontal swinging movement of said passageway about said upright axis, and for vertically pivoting said passageway about said inner transverse horizontal axis;
   (d) means pivotally interconnecting said outer supporting means and said passageway for relative pivotal movement thereof about an outer transverse horizontal axis;
(e) said outer supporting means including ground-engaging wheel means movable along a predetermined arc about said upright axis;
(f) said outer supporting means including vertically extensible and contractible means for vertically pivoting said passageway about said inner transverse horizontal axis to raise and lower said outer end of said passageway; and
(g) control means interconnecting said outer supporting means and said passageway, and responsive to extension and contraction of said vertically extensible and contractible means to raise and lower said outer end of said passageway for pivoting said outer supporting means relative to said passageway about said outer transverse horizontal axis in directions to maintain said wheel means substantially on said predetermined arc.

3. In a vehicle loading ramp, the combination of:
(a) a passageway having inner and outer ends;
(b) inner supporting means connected to said inner end of said passageway and supporting same for horizontal swinging movement of said passageway about an upright axis and for vertical pivotal movement of said passageway about an inner transverse horizontal axis;
(c) upright outer supporting means supporting said outer end of said passageway for horizontal swinging movement of said passageway about said upright axis, and for vertically pivoting said passageway about said inner transverse horizontal axis;
(d) means pivotally interconnecting said outer supporting means and said passageway for relative pivotal movement thereof about an outer transverse horizontal axis;
(e) said outer supporting means including ground-engaging wheel means movable along a predetermined arc about said upright axis;
(f) said outer supporting means including vertically extensible and contractible means for vertically pivoting said passageway about said inner transverse horizontal axis to raise and lower said outer end of said passageway.
(g) control means interconnecting said passageway and said outer supporting means for pivoting said outer supporting means relative to said passageway about said outer transverse horizontal axis in directions to maintain said wheel means substantially on said predetermined arc as said outer end of said passageway is raised and lowered; and
(h) means for actuating said vertically extensible and contractible means and said control means in synchronism.

4. In a vehicle loading ramp, the combination of:
(a) a passageway having inner and outer ends;
(b) inner supporting means connected to said inner end of said passageway and supporting same for horizontal swinging movement of said passageway about an upright axis and for vertical pivotal movement of said passageway about an inner transverse horizontal axis;
(c) upright outer supporting means supporting said outer end of said passageway for horizontal swinging movement of said passageway about said upright axis, and for vertically pivoting said passageway about said inner transverse horizontal axis;
(d) means pivotally interconnecting said outer supporting means and said passageway for relative pivotal movement thereof about an outer transverse horizontal axis;
(e) said outer supporting means including ground-engaging wheel means movable along a predetermined arc about said upright axis;
(f) said outer supporting means including vertically extensible and contractible means for vertically pivoting said passageway about said inner transverse horizontal axis to raise and lower said outer end of said passageway;
(g) control means interconnecting said passageway and said outer supporting means for pivoting said outer supporting means relative to said passageway about said outer transverse horizontal axis in directions to maintain said wheel means substantially on said predetermined arc as said outer end of said passageway is raised and lowered;
(h) said vertically extensible and contractible means and said control means respectively including rotatable screws; and
(i) means for rotating said screws in synchronism.

References Cited
UNITED STATES PATENTS

| | | | |
|---|---|---|---|
| 2,875,457 | 3/1959 | Read | 14—71 |
| 3,110,048 | 11/1963 | Bolton | 14—71 |
| 3,263,253 | 8/1966 | Wollard et al. | 14—71 |

JACOB L. NACKENOFF, *Primary Examiner.*